(12) United States Patent
Markman et al.

(10) Patent No.: US 8,234,684 B2
(45) Date of Patent: Jul. 31, 2012

(54) DIGITAL DETECTOR FOR ATSC DIGITAL TELEVISION SIGNALS

(75) Inventors: Ivonete Markman, Carmel, IN (US); Gabriel Alfred Edde, Indianapolis, IN (US); Max Ward Muterspaugh, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1112 days.

(21) Appl. No.: 12/084,543

(22) PCT Filed: Jun. 5, 2006

(86) PCT No.: PCT/US2006/216420
§ 371 (c)(1),
(2), (4) Date: May 5, 2008

(87) PCT Pub. No.: WO2007/053196
PCT Pub. Date: May 10, 2007

(65) Prior Publication Data
US 2010/0171877 A1   Jul. 8, 2010

Related U.S. Application Data

(60) Provisional application No. 60/734,207, filed on Nov. 7, 2005.

(51) Int. Cl.
*H04N 7/173* (2006.01)

(52) U.S. Cl. ........ 725/118; 348/731; 348/732; 375/326; 375/368

(58) Field of Classification Search .................. 725/118; 348/731, 732; 375/368, 270, 293, 294, 321, 375/324–327, 354–355, 373, 376
See application file for complete search history.

(56) References Cited

U.S. PATENT DOCUMENTS

| | | | |
|---|---|---|---|
| 6,108,049 A | 8/2000 | Limberg | |
| 6,233,295 B1 | 5/2001 | Wang | |
| 6,369,857 B1 * | 4/2002 | Balaban et al. | 348/555 |
| 6,445,425 B1 | 9/2002 | Limberg | |

(Continued)

FOREIGN PATENT DOCUMENTS

CA  2149584  11/1995

(Continued)

OTHER PUBLICATIONS

Douglas Prendergast,"On the Implementation of ATSC-DTV forward channel and a Terrestrial Return Channel incorporating Cognitive Radio (Unlicensed Devices)", Jul. 11, 2005, IEEE P802.22-05/0057r0.*

(Continued)

*Primary Examiner* — Scott Beliveau
*Assistant Examiner* — Alan Luong
(74) *Attorney, Agent, or Firm* — Robert D. Shedd; Joseph J. Opalach (57) ABSTRACT

A Wireless Regional Area Network (WRAN) receiver comprises a transceiver for communicating with a wireless network over one of a number of channels, and an Advanced Television Systems Committee (ATSC) signal detector for use in forming a supported channel list comprising those ones of the number of channels upon which an ATSC signal was not detected, wherein the ATSC signal detector is a threshold-based detector and detects an ATSC signal as a function of at least one threshold, and wherein the ATSC signal detector is responsive to at least one of a carrier tracking loop lock signal, a symbol timing recovery lock signal and a synchronization (sync) lock signal.

20 Claims, 8 Drawing Sheets

U.S. PATENT DOCUMENTS

| | | | |
|---|---|---|---|
| 6,449,325 | B1 | 9/2002 | Limberg |
| 6,545,723 | B1 | 4/2003 | Han |
| 2001/0007476 | A1 | 7/2001 | Hong et al. |
| 2003/0190002 | A1* | 10/2003 | Azakami et al. .............. 375/368 |
| 2006/0007299 | A1 | 1/2006 | Wang et al. |

FOREIGN PATENT DOCUMENTS

| | | |
|---|---|---|
| JP | 08275083 | 10/1996 |
| KR | 200168618 | 7/2001 |
| KR | 2001068618 | 7/2001 |
| KR | 2002014255 | 2/2002 |
| KR | 2002014255 A | 2/2002 |
| WO | WO9642170 | 12/1996 |
| WO | WO 2004/049706 * | 6/2004 |
| WO | WO2004049699 | 6/2004 |
| WO | WO2004049706 | 6/2004 |
| WO | WO2005114937 | 12/2005 |

OTHER PUBLICATIONS

Prendergast, Douglas: "On the Implementation of ATSC-DTV Forward Channel and a Terrestrial Return Channel Incorporating Cognitive Radio (Unlicensed Devices)", IEEE P802.22 Wireless RANS, [Online] Jul. 11, 2005, XP002398488.

Cabric, Danijela et al.: "Implementation Issues in Spectrum Sensing for Cognitive Radios" [Online] 2004, XP002398490.

Muterspaugh, Max et al.: "Thomson Proposal Outline for WRAN", IEEE 802.22-05/0096R1, [Online], Slides 1-35, Nov. 7, 2005, XP002398489.

International Search Report, dated Sep. 25, 2006.

* cited by examiner

FIG. 1

ATSC 8-VSB Data Segment

FIG. 2

ATSC 8-VSB Field Sync

DIGITAL DETECTOR FOR ATSC DIGITAL TELEVISION SIGNALS

This application claims the benefit, under 35 U.S.C. §365 of International Application PCT/US2006/021642, filed Jun. 5, 2006, which was published in accordance with PCT Article 21(2) on May 10, 2007 in English and which claims the benefit of U.S. provisional patent application No. 60/734,207, filed Nov. 7, 2005.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

A Wireless Regional Area Network (WRAN) system is being studied in the IEEE 802.22 standard group. The WRAN system is intended to make use of unused television (TV) broadcast channels in the TV spectrum, on a non-interfering basis, to address, as a primary objective, rural and remote areas and low population density underserved markets with performance levels similar to those of broadband access technologies serving urban and suburban areas. In addition, the WRAN system may also be able to scale to serve denser population areas where spectrum is available. Since one goal of the WRAN system is not to interfere with TV broadcasts, a critical procedure is to robustly and accurately sense the licensed TV signals that exist in the area served by the WRAN (the WRAN area).

In the United States, the TV spectrum currently comprises ATSC (Advanced Television Systems Committee) broadcast signals that co-exist with NTSC (National Television Systems Committee) NTSC broadcast signals. The ATSC broadcast signals are also referred to as digital TV (DTV) signals. Currently, NTSC transmission will cease in 2009 and, at that time, the TV spectrum will comprise only ATSC broadcast signals.

Since, as noted above, one goal of the WRAN system is to not interfere with those TV signals that exist in a particular WRAN area, it is necessary to efficiently detect the presence of an ATSC DTV signal down to 20 dB (decibels) below threshold of visibility (TOV) for the ATSC DTV signal, in order to be able to avoid harmful interference to licensed ATSC DTV signals in a particular channel.

SUMMARY OF THE INVENTION

In accordance with the principles of the invention, an apparatus comprises a transceiver for communicating with a wireless network over one of a number of channels, and an Advanced Television Systems Committee (ATSC) signal detector for use in forming a supported channel list comprising those ones of the number of channels upon which an ATSC signal was not detected, wherein the ATSC signal detector is a threshold-based detector and detects an ATSC signal as a function of at least one threshold, and wherein the ATSC signal detector is responsive to at least one of a carrier tracking loop lock signal, a symbol timing recovery lock signal and a synchronization (sync) lock signal.

In an illustrative embodiment of the invention, the receiver is a Wireless Regional Area Network (WRAN) receiver.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Further information on ATSC broadcast signals can be found in the following ATSC standards: Digital Television Standard (A/53), Revision C, including Amendment No. 1 and Corrigendum No. 1, Doc. A/53C; and *Recommended Practice: Guide to the Use of the ATSC Digital Television Standard* (A/54). Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)), and receiver components such as a radio-frequency (RF) front-end, or receiver section, such as a low noise block, tuners, and demodulators, correlators, leak integrators and squarers is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 1:
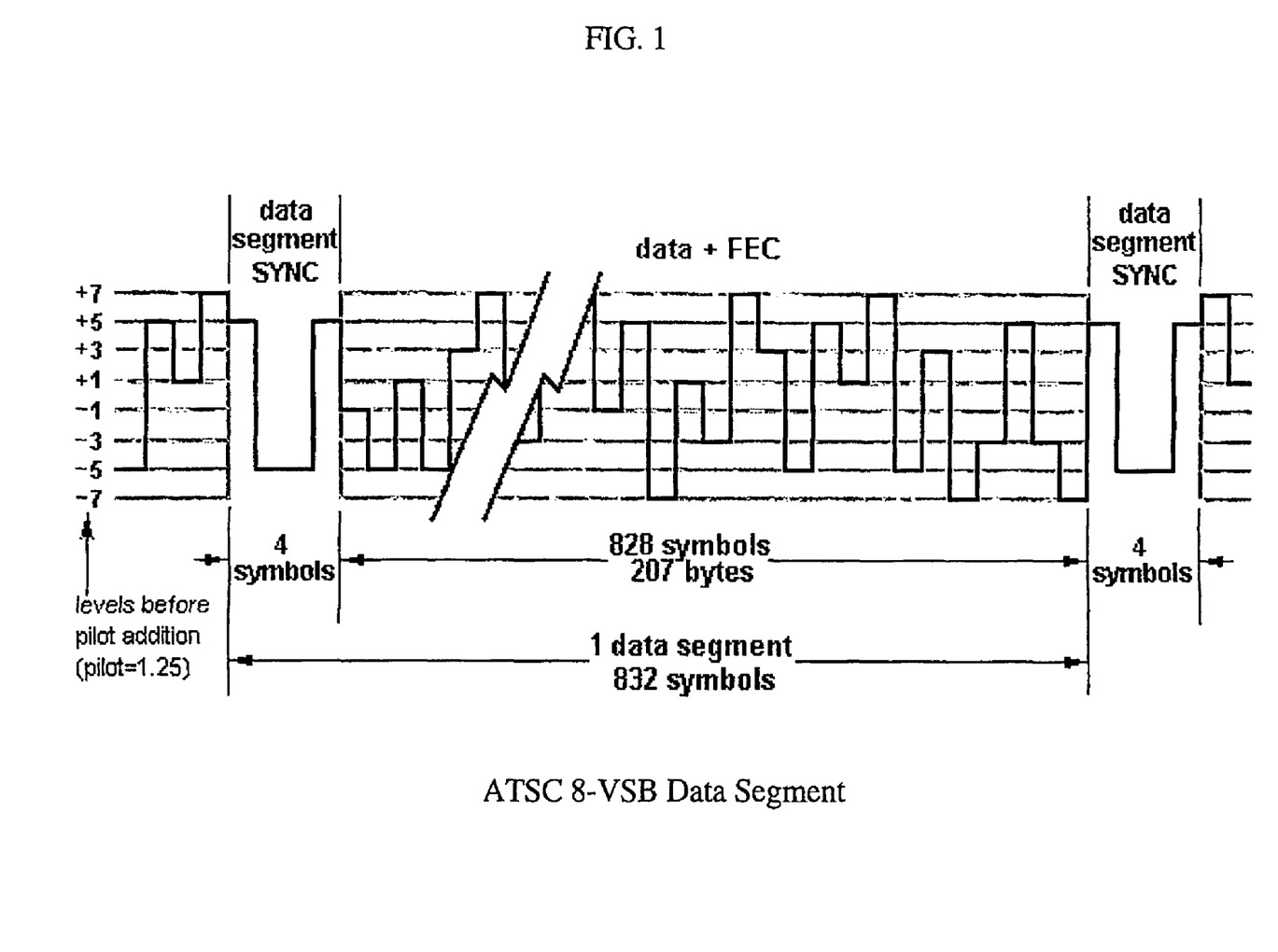
FIGS. 1 and 2 show a format for an ATSC DTV signal.
Figure 2:
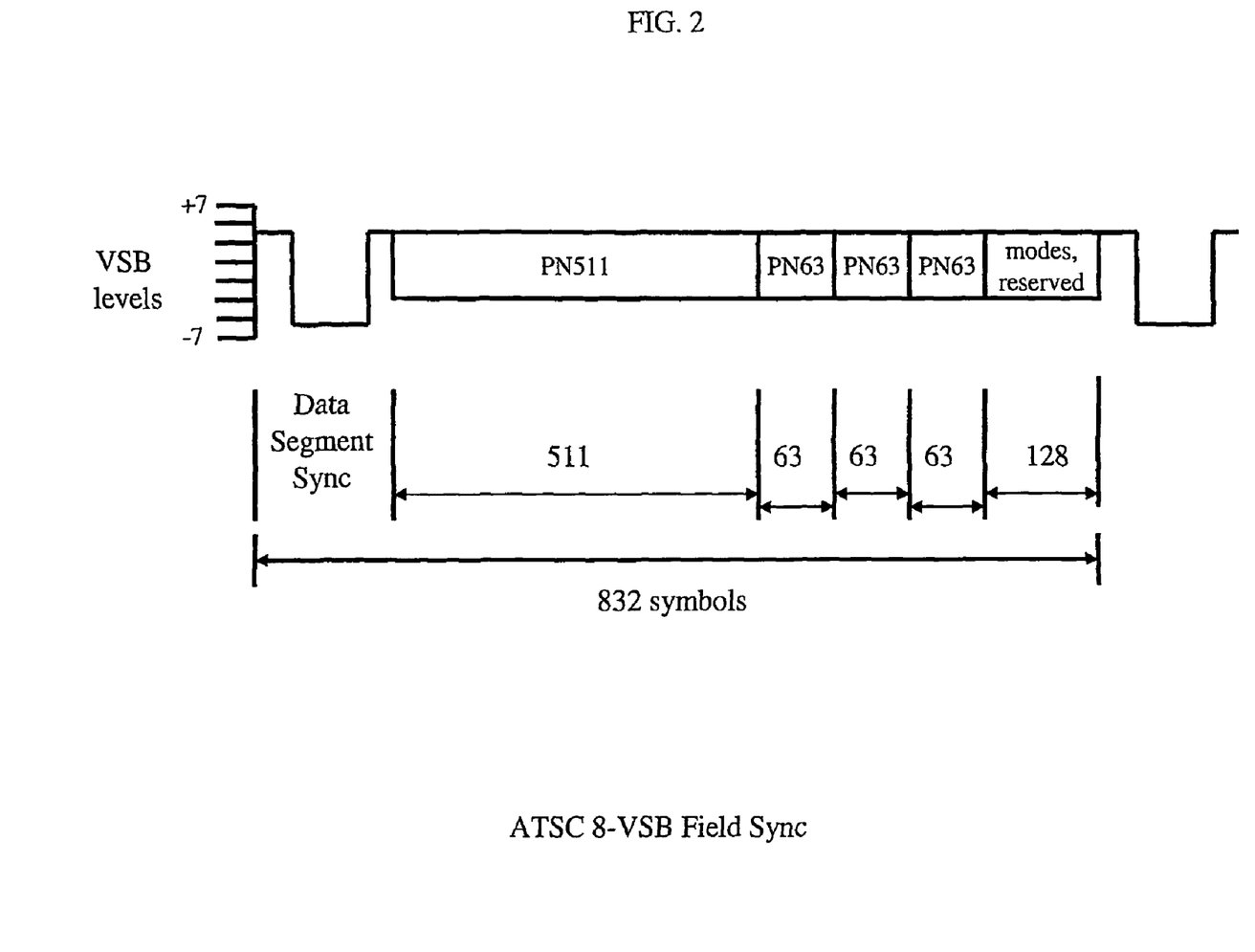

Before describing the inventive concept, a brief description of an ATSC DTV signal is provided in conjunction with FIGS. 1 and 2. DTV data is modulated using 8-VSB (vestigial sideband). In an ATSC DTV signal, besides the eight-level digital data stream, a two-level (binary) four-symbol data segment sync is inserted at the beginning of each data segment. An ATSC data segment is shown in FIG. 1. The ATSC data segment consists of 832 symbols: four symbols for data segment sync, and 828 data symbols. The data segment sync pattern is a binary 1001 pattern, as can be observed from FIG. 1. Multiple data segments (313 segments) comprise an ATSC data field, which comprises a total of 260,416 symbols (832× 313). The first data segment in a data field is called the field sync segment. The structure of the field sync segment is shown in FIG. 2, where each symbol represents one bit of data (two-level). In the field sync segment, a pseudo-random sequence of 511 bits (PN511) immediately follows the data segment sync. After the PN511 sequence, there are three identical pseudo-random sequences of 63 bits (PN63) concatenated together, with the second PN63 sequence being inverted every other data field.

Figure 3:
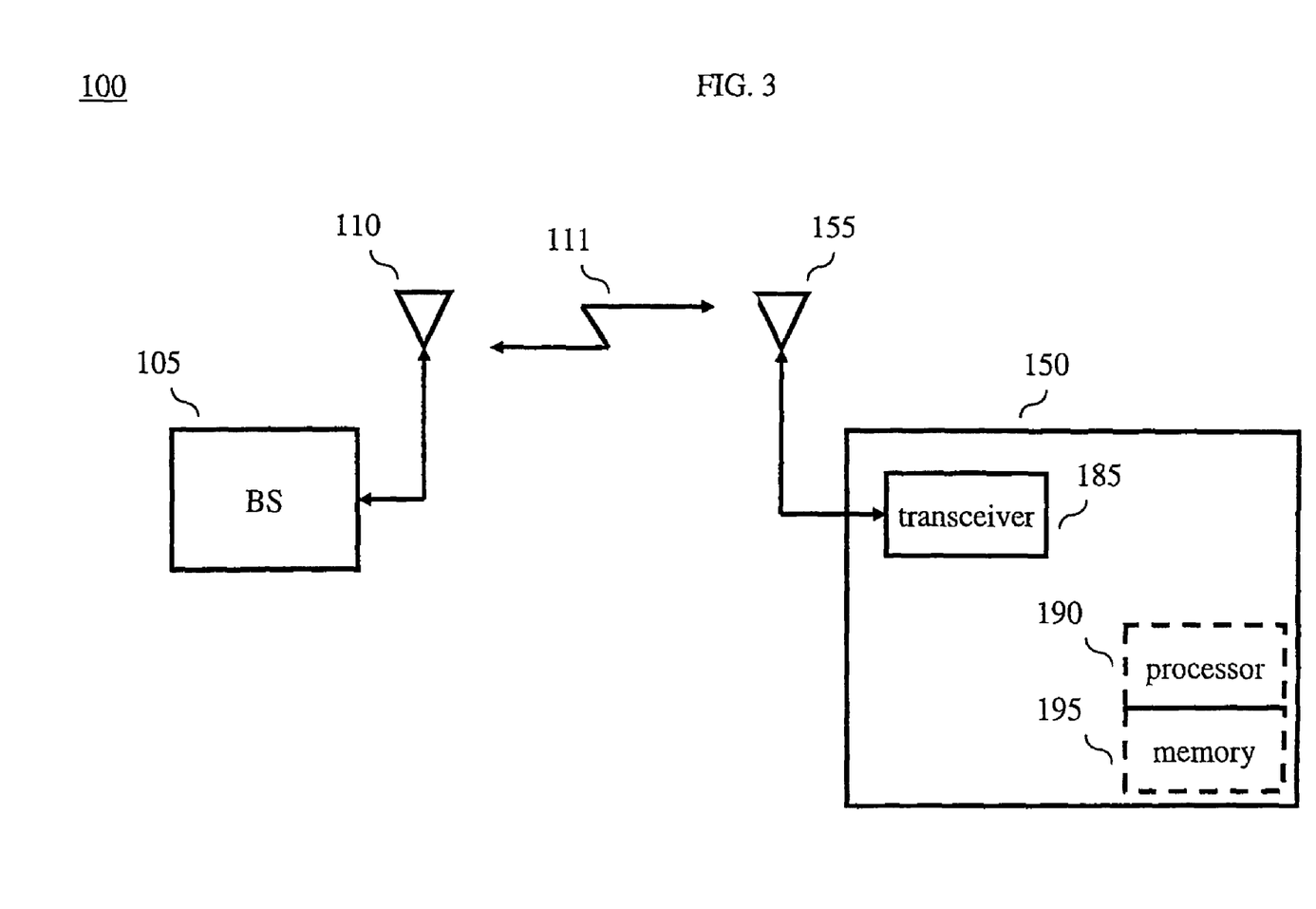
FIG. 3 shows an illustrative WRAN system in accordance with the principles of the invention.

Turning now to FIG. 3, an illustrative Wireless Regional Area Network (WRAN) system 100 incorporating the principles of the invention is shown. WRAN system 100 serves a geographical area (the WRAN area) (not shown in FIG. 3). In general terms, a WRAN system comprises at least one base station (BS) 105 that communicates with one, or more, customer premise equipment (CPE) 150. The latter may be stationary or mobile. CPE 150 is a processor-based system and includes one, or more, processors and associated memory as represented by processor 190 and memory 195 shown in the form of dashed boxes in FIG. 3. In this context, computer programs, or software, are stored in memory 195 for execution by processor 190. The latter is representative of one, or more, stored-program control processors and these do not have to be dedicated to the transmitter function, e.g., processor 190 may also control other functions of CPE 150. Memory 195 is representative of any storage device, e.g., random-access memory (RAM), read-only memory (ROM), etc.; may be internal and/or external to CPE 150; and is volatile and/or non-volatile as necessary. The physical layer of communication between BS 105 and CPE 150, via antennas 110 and 155, is illustratively OFDM-based, via transceiver 185, and is represented by arrows 111. To enter a WRAN network, CPE 150 may first "associate" with BS 110. During this association, CPE 150 transmits information via transceiver 185 on the capability of CPE 150 to BS 105 via a control channel (not shown). The reported capability includes, e.g., minimum and maximum transmission power, and a supported channel list for transmission and receiving. In this regard, CPE 150 performs "channel sensing" in accordance with the principles of the invention to determine which TV channels are not active in the WRAN area. The resulting supported channel list for use in WRAN communications is then provided to BS 105.

As noted earlier, a WRAN system makes use of unused television (TV) broadcast channels in the TV spectrum. In this regard, the WRAN system performs "channel sensing" to determine which of these TV channels are actually active (or "incumbent") in the WRAN area in order to determine that portion of the TV spectrum that is actually available for use by the WRAN system. In particular, it is necessary for elements of the WRAN system to efficiently detect the presence of an ATSC DTV signal down to 20 dB (decibels) below threshold of visibility (TOV) for the ATSC DTV signal, in order to be able to avoid harmful interference to licensed ATSC DTV signals in a particular channel. In the description that follows, it is assumed that the ATSC DTV signal is embedded in noise or other interference with a D/U (Desired-to-Undesired) signal power ratio of at least −5 dB. In these extreme conditions, an ATSC receiver will not work. However, an ATSC signal detector conforming to the principles of the invention will be able to detect an ATSC DTV signal under such extreme conditions.

Figure 4:
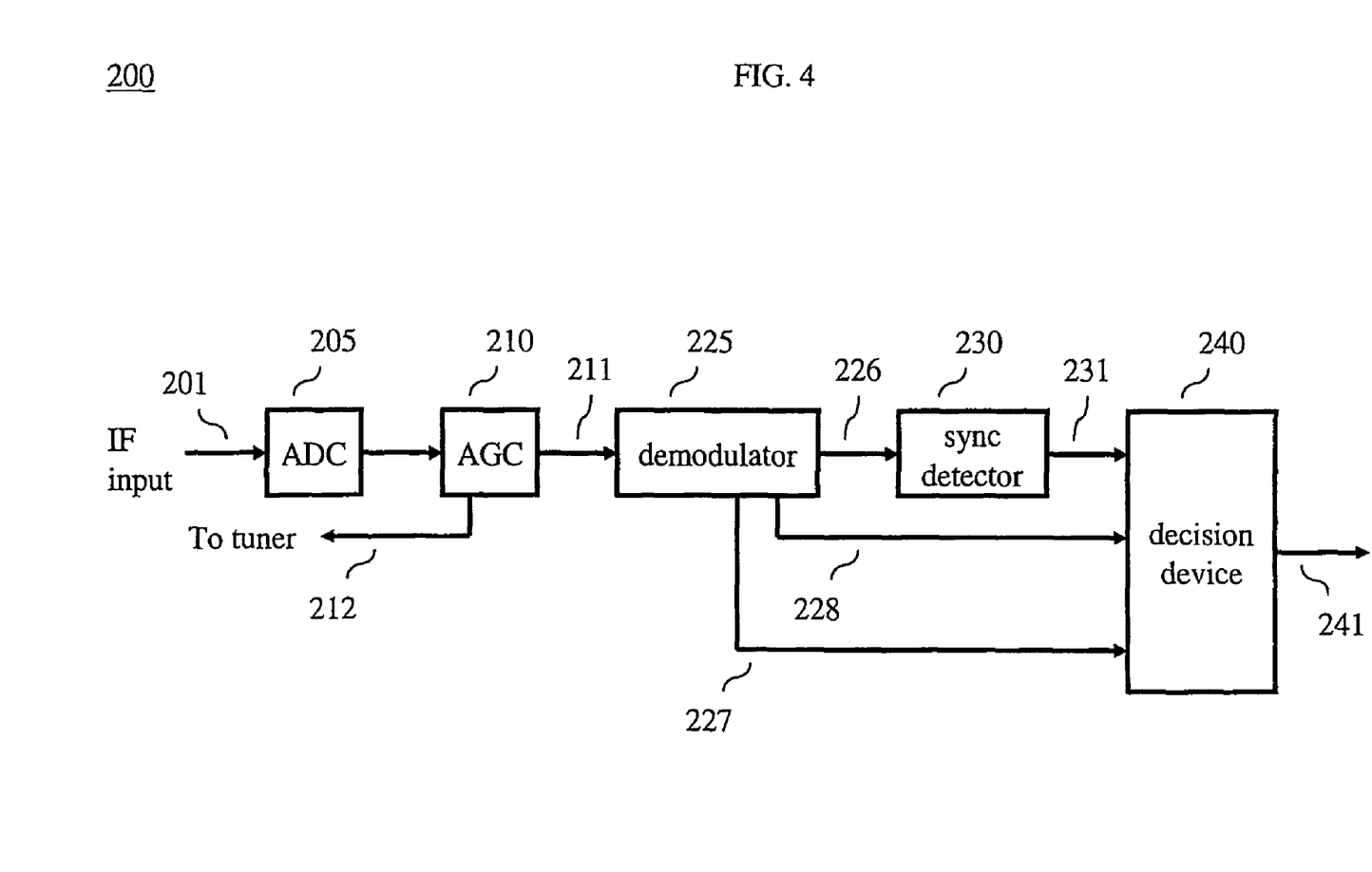
FIG. 4 shows an illustrative receiver for use in the WRAN system of FIG. 3 in accordance with the principles of the invention.

An illustrative portion of a receiver 200 for use in CPE 150 is shown in FIG. 4. Only that portion of receiver 200 relevant to the inventive concept is shown. In particular, receiver 200 includes analog-to-digital converter (ADC) 205, automatic gain controller (AGC) 210, demodulator 225, sync detector 230 and decision device 240. Receiver 200 is controlled by a processor, e.g., processor 190 of FIG. 3. Input signal 201 represents a digital VSB modulated signal in accordance with the above-mentioned "ATSC Digital Television Standard" and is centered at a specific IF (Intermediate Frequency) of $f_{IF}$ Hertz. Input signal 201 is provided by a tuner (not shown), which is tuned to a particular DTV channel. Input signal 201 is sampled by ADC 205 for conversion to a sampled signal, which is then gain controlled by AGC 210. The latter is noncoherent and is a mixed mode (analog and digital) loop that provides a first level of gain control (prior to carrier tracking), symbol timing and sync detection of the VSB signal included within signal 201. AGC 210 basically compares the absolute values of the sampled signal from ADC 205 against a predetermined threshold, accumulates the error and feeds that information, via signal 212, back to the tuner for gain control prior to ADC 205. As such, AGC 210 provides a gain controlled signal 211 to demodulator 225. The latter demodulates gain controlled signal 211 to provide demodulated signal 226, carrier tracking loop (CTL) lock signal 227 and symbol timing recovery (STR) lock signal 228. In particular, demodulator 225 comprises a carrier tracking loop (CTL) and a symbol timing recovery (STR) loop (both described below) for performing carrier tracking and symbol timing recovery. In this regard, CTL lock signal 227 and STR lock signal 228 represent demodulator lock conditions for the CTL and STR loop, respectively, and, e.g., may be a function of the loop filter integrator outputs inside both the CTL and STR loop. CTL lock signal 227 and STR lock signal 228 are provided to decision device 240. With regard to the remaining output signal of demodulator 225, demodulated signal 226, this signal is processed by sync detector 230. Sync detector 230 detects either the ATSC data segment sync, ATSC field segment sync, or both of these syncs and, upon detection, provides sync lock signal 231 to decision device 240. As described further below, decision device 240 monitors one, or more, of CTL lock signal 227, STR lock signal 228 and sync lock signal 231 to determine whether or not an ATSC DTV signal has been detected in the DTV channel of interest. Decision device 240 provides information regarding the detection of an ATSC DTV signal via signal 241.

Figure 5:
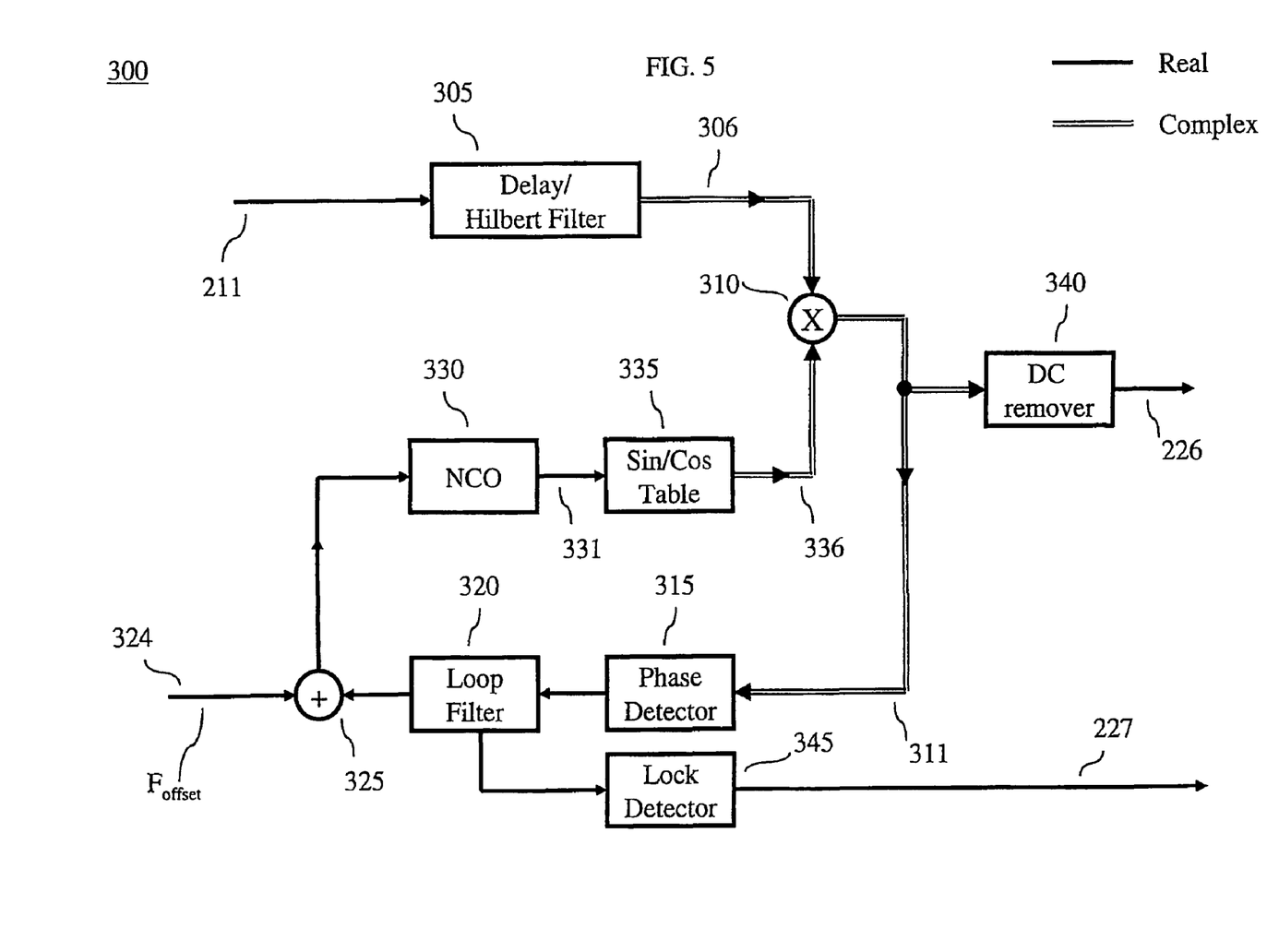
FIG. 5 shows an illustrative carrier tracking loop for use in the receiver of FIG. 4.

An illustrative ATSC pilot carrier based CTL 300 for use in demodulator 225 is shown in FIG. 5. CTL 300 recovers a coherent carrier and downconverts the signal to baseband using a digital phase locked loop. CTL 300 includes delay/Hilbert filter element 305, complex multiplier 310, phase detector 315, loop filter 320, lock detector 345, combiner (or adder) 325, numerically controlled oscillator (NCO) 330, sine/cosine (sin/cos) table 335 and DC remover 340. It should be noted that other carrier tracking loop designs are possible, as long as they achieve the same performance. Delay/Hilbert filter element 305 includes a Hilbert filter and an equivalent delay line that matches the Hilbert filter processing delay. As known in the art, a Hilbert Filter is an all-pass filter that introduces a −90° phase shift to all input frequencies greater than 0 (and a +90° degree phase shift to negative frequencies). The Hilbert filter allows recovery of the quadrature component of the output signal 211 from AGC 210. Recovery of the quadrature component is necessary because both the in-phase and quadrature components of the signal are needed in order for the CTL to correct the phase and lock to the ATSC pilot carrier signal. As such, the output signal 306 from delay/Hilbert filter element 305 is a complex sample stream comprising in-phase (I) and quadrature (Q) components. It should be noted that complex signal paths are shown as double lines in the figures. Following the Hilbert filter block, the signal is processed by a digital CTL (310, 315, 320, 325, 330 and 335), which processes the complex sample stream to down convert the IF signal (211) to baseband, and to correct for frequency offsets between the transmitter ATSC carrier and the receiver tuner Local Oscillator (LO) (not shown) (e.g., see, United States Advanced Television Systems Committee, "Guide to the Use of the ATSC Digital Television Standard", Document A/54, Oct. 4, 1995; and U.S. Pat. No. 6,233,295 issued May 15, 2001 to Wang, entitled "Segment Sync Recovery Network for an HDTV Receiver"). The digital CTL is a second order loop, which in theory, allows for frequency offsets to be tracked with no phase error. In practice, phase error is a function of the loop bandwidth, input phase noise and implementation constraints like bit size of the data, integrators and gain multipliers.

Turning now to the particular components of the digital CTL, complex multiplier 310 receives the complex sample stream of signal 306 and performs de-rotation of the complex sample stream by a calculated phase angle. In particular, the in-phase and quadrature components of signal 306 are rotated by a phase. The latter is provided by signal 336, which represents particular sine and cosine values provided by sin/cos table 335. The output signal from complex multiplier 310 is down-converted received signal 311, which represents a de-rotated complex sample stream. As can be observed from FIG. 5, the down-converted received signal 310 is applied to DC remover 340 and phase detector 315.

With respect to phase detector 315, this element computes any phase offset still present in the down-converted signal 311 and provides a phase offset signal indicative thereof. This computation can be performed with a "I*Q" or a "sign(I)*Q" function. The phase offset signal provided by phase detector 315 is applied to loop filter 320, which is a first order filter with proportional-plus-integral gains. Ignoring for the moment combiner 325, the loop filtered output signal from loop filter 320 is applied to NCO 330. The latter is an integrator, which takes as an input signal a frequency, and provides an output signal representative of phase angles associated with the input frequency. However, in order to increase the acquisition speed, the NCO is fed a frequency offset, $F_{OFFSET}$, corresponding to $F_{PILOT}$ (where $F_{PILOT}$ is the pilot frequency), which is added to the loop filter output signal via combiner 325 to provide a combined signal to NCO 330. NCO 330 provides an output phase angle signal 331 to sin/cos table 335, which provides the associated sine and cosine values to complex multiplier 310 for de-rotation of signal 306 to provide down-converted received signal 311. As noted above, down-converted received signal 311 is also provided to DC remover 340. When CTL 300 is locked to a received ATSC DTV signal, the ATSC pilot carrier present in the received ATSC DTV signal creates a DC offset in the down-converted received signal 311. DC remover 340 removes the DC offset to provide demodulated signal 226. Also, as noted earlier, it should also be observed from FIG. 5 that loop filter 320 feeds lock detector 345, which provides lock signal 227, which is indicative of when demodulator 225 has acquired an ATSC DTV pilot carrier.

Figure 6:
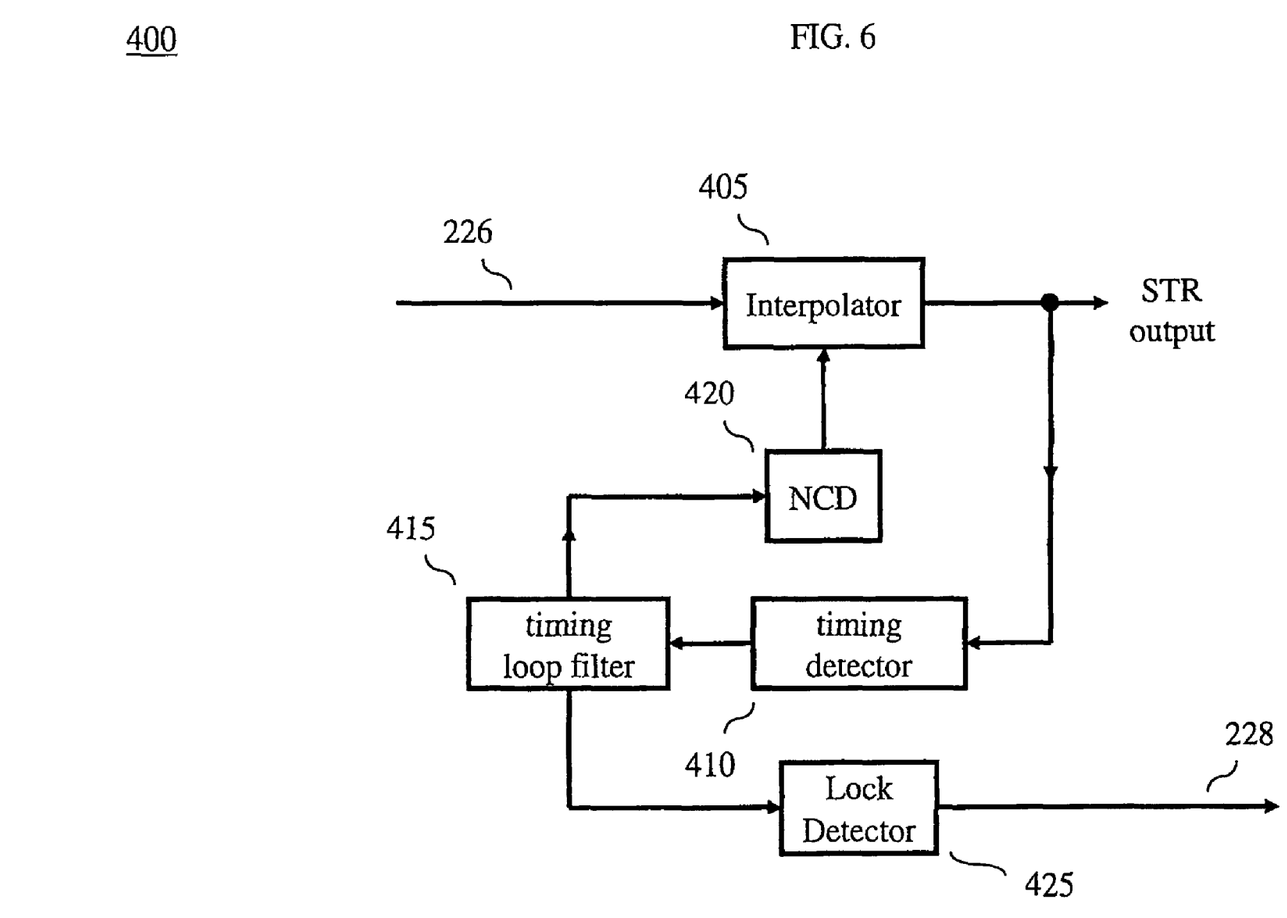
FIG. 6 shows an illustrative symbol timing recovery loop for use in the receiver of FIG. 4.

Referring now to FIG. 6, an illustrative STR loop 400 is shown. STR loop 400 comprises interpolator 405, timing detector 410, timing loop filter 415, lock detector 425 and NCD 420. STR 400 is used to re-sample the demodulated signal, lock to the incoming VSB symbol data and provide a symbol rate clock for all subsequent demodulator stages downstream (not shown). Other than the inventive concept, the elements of STR 400 are well-known and not described further herein. Demodulated signal 226 first enters interpolator filter 405 and gets re-sampled at the symbol data rate. This re-sampled data is then sent to the digital phase locked loop (410, 415 and 420). This loop is comprised of timing detector 410, a timing loop filter 415 and an numerically controlled delay (NCD) 420. The timing detector 410 performs the phase detector function of the digital phase loop (e.g., see Floyd M. Gardner, "A BPSK/QPSK Timing-Error Detector for Sample Receivers", IEEE Transactions on Communications, Vol. COM-34, no. 5, pp. 423-29, May 1986). The phase detector output from timing detector 410 is then sent, via timing loop filter 415, to NCD 420. The latter performs the digital voltage controlled oscillator (VCO) function and the output signal from NCD 420 is provided to the input of interpolator 405 to control the interpolator delay. Finally, it should also be observed from FIG. 6 that timing loop filter 415 feeds lock detector 425, which provides lock signal 228, which is indicative of when STR loop 400 has acquired an ATSC symbol stream.

As previously mentioned, the ATSC signal is transmitted with embedded sync information. The data is divided into segments and then groups of segments are divided into fields. The purpose of the sync detection circuitry 230 in FIG. 4 is to locate these sync signals within the data and provide indicator signals 231 identifying a locked condition. There are two basic algorithms to choose from: segment and field detection. The field sync location can be more accurate, however, it may take longer to acquire sync, since field syncs are approximately 25 ms apart. The segment sync algorithm can be much faster since the segment syncs occur more often, however, it may not be as accurate. In an illustrative sync detector, both algorithms may be based on correlation against the known sync pattern and appropriate averaging to insure reliability (see the above noted U.S. Pat. No. 6,233,295).

Figure 7:
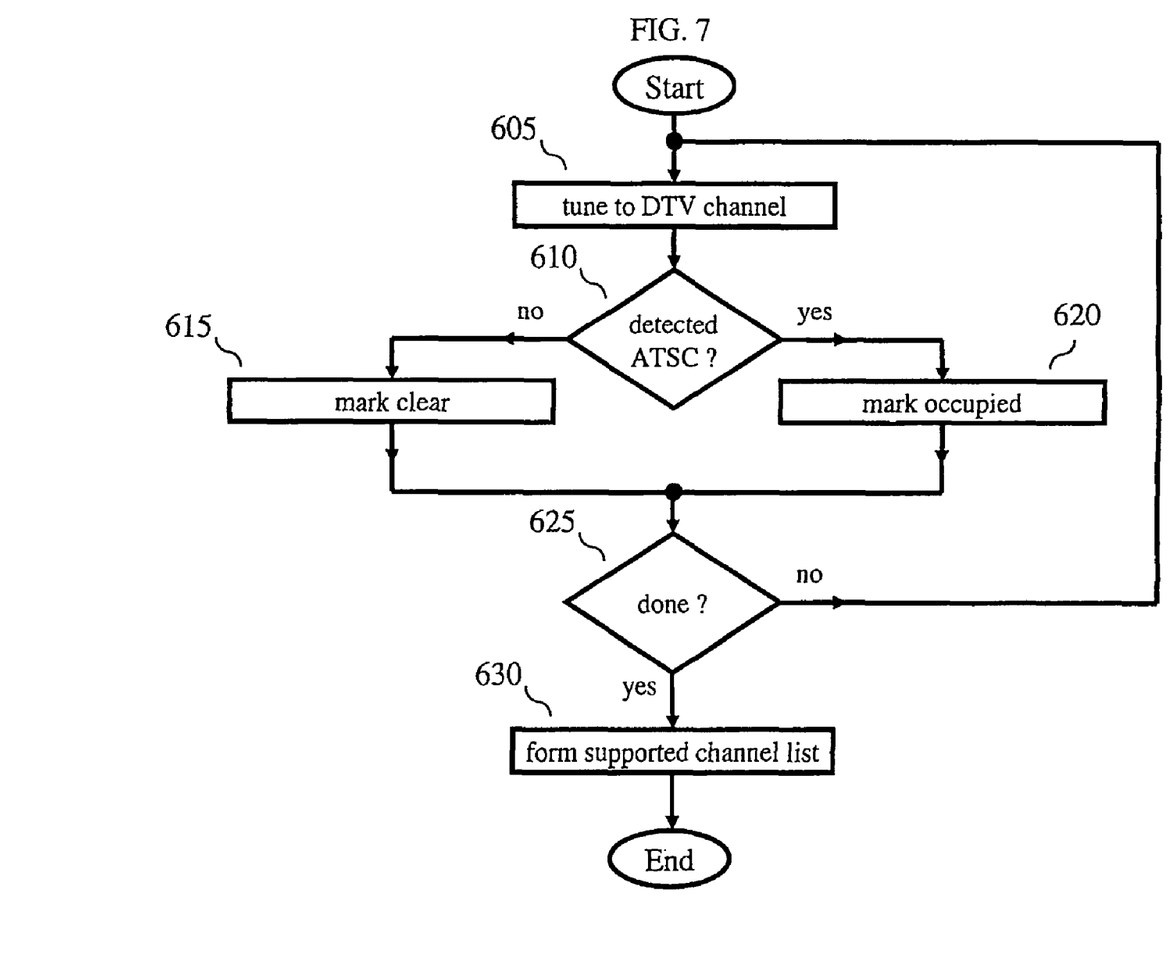
FIG. 7 shows an illustrative flow chart in accordance with the principles of the invention for use in the WRAN system of FIG. 3.

Turning now to FIG. 7, an illustrative flow chart for channel sensing in accordance with the principles of the invention for use in receiver 200 is shown. In step 605, receiver 200 tunes to one of a number of ATSC DTV channels. In step 265, receiver 200 checks if an ATSC DTV signal is detected (described further below). If an ATSC DTV signal is detected, receiver 200 marks the ATSC DTV channel as occupied in step 620. On the other hand, if an ATSC DTV signal is not detected, receiver 200 marks the ATSC DTV channel as clear in step 615. In either case, receiver 200 checks if the scan, or channel sensing, of ATSC DTV channels is done in step 625. If the scan is not done, then receiver 200 returns to step 605 and tunes to another ATSC DTV channel. However, if the scan is finished, receiver 200 forms the supported channel list in step 630 for communication to BS 105 of FIG. 3.

Figure 8:
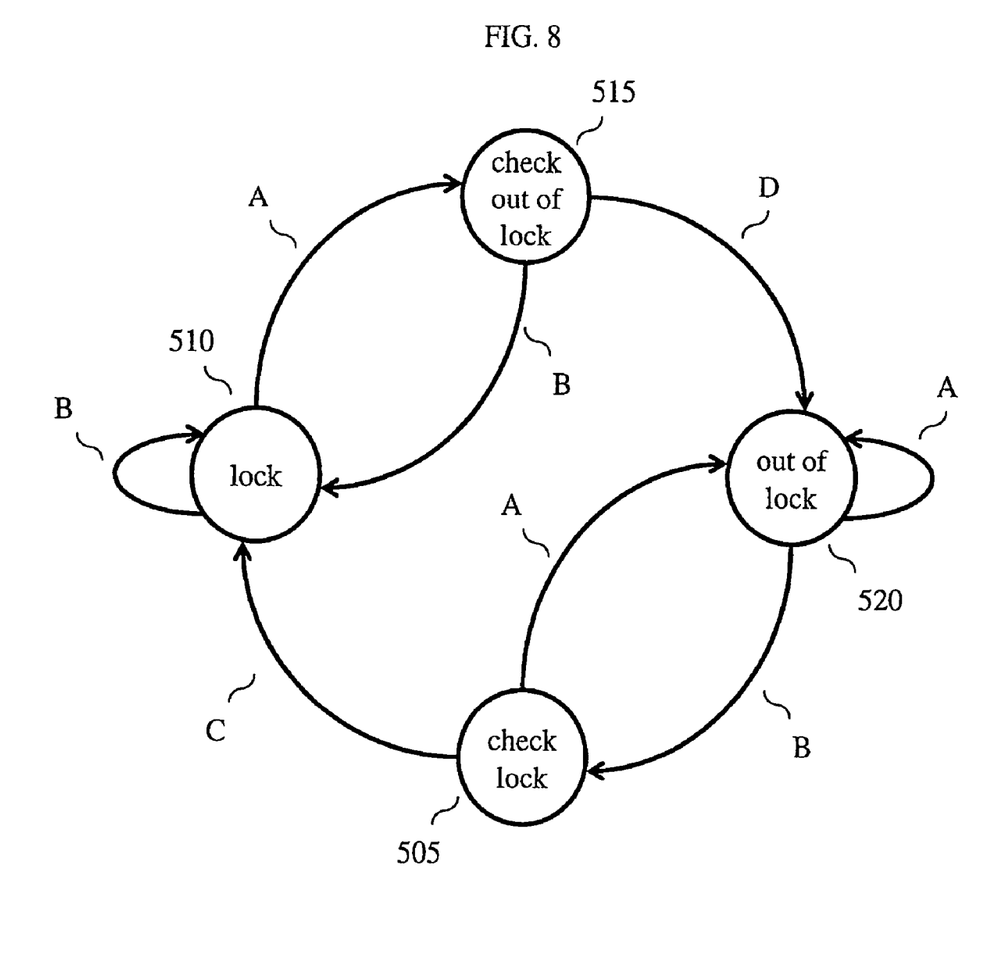
FIG. 8 shows an illustrative state transition diagram in accordance with the principles of the invention for use in the WRAN system of FIG. 3.

In accordance with the principles of the invention, receiver 200 checks if an ATSC DTV signal is detected in step 610 of FIG. 7. In particular, decision device 240 of FIG. 4 monitors one, or more, of CTL lock signal 227, STR lock signal 228 and sync lock signal 231 to determine whether or not an ATSC DTV signal has been detected in the DTV channel of interest. Illustratively, the decision device 240 may comprise a combinatorial logic function, e.g., an AND or OR function of some or all of the lock indicators. Also illustratively, decision device 240 may declare an ATSC DTV signal has been detected in accordance with threshold-based rules, as illustrated in the state transition diagram shown in FIG. 8. In other words, decision device 250 is a state machine. As can be observed from FIG. 8, there are four states:

"check lock" state 505;
"lock" state 510;
"check out of lock" state 515; and
"out of lock" state 520.

In addition, as shown in FIG. 8, there are a number of conditions for transiting from one state to another. Illustratively, in FIG. 8 there are four conditions for state transitions, labeled "A", "B", "C" and "D". These are defined as:

A—one, or more, lock detector signals (227, 228 and/or 231) are less than a threshold;

B—one, or more, lock detector signals (227, 228 and/or 231) are greater than a threshold;

C—one, or more, lock detector signals (227, 228 and/or 231) are greater than a threshold for a predefined interval, $T_C$; and D—one, or more, lock detector signals (227, 228 and/or 231) are less than a threshold for a predefined interval, $T_D$;

The predefined intervals, $T_C$ and $T_D$ can be determined empirically and/or can be related to, e.g., an ATSC data segment interval, PN511 interval, PN63 interval, etc. Although it is assumed that each lock detector signal has an associated threshold, the inventive concept is not so limited. In the "lock" state (510) and the "check out of lock" state (515), decision device 240 provides, via signal 241, an ATSC signal detected indicator (e.g., a binary digit having a logical "1" value, i.e., "TRUE"). Otherwise, in the "out of lock" state (520) and the "check lock" state (505), decision device 240 provides, via signal 241, an ATSC signal not detected indicator (e.g., a binary digit having a logical "0" value, i.e., "FALSE").

As described above, the inventive concept proposes an efficient threshold-based ATSC DTV signal detector, which can be used to identify the presence of an ATSC signal buried in noise or other types of interference down to 20 dB below the ATSC threshold of visibility (TOV). It should be noted that the decision device may be designed to be solely based on the CTL lock indicator, STR lock indicator, sync detection information (data segment sync and/or field segment sync) or a combination of the various lock indicators. It should also be noted that although the receiver of FIG. 4 is described in the context of CPE 150 of FIG. 3, the invention is not so limited and also applies to, e.g., a receiver of BS 105 that may perform channel sensing. Further, although the receiver of FIG. 4 is described in the context of a WRAN system, the invention is not so limited and applies to any receiver that performs channel sensing.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the steps shown in, e.g., FIG. 7, etc. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. Apparatus comprising:
a transceiver for communicating with a wireless network over one of a number of channels; and
an Advanced Television Systems Committee (ATSC) signal detector for use in forming a supported channel list comprising those ones of the number of channels upon which an ATSC signal was not detected,
wherein the ATSC signal detector is a threshold-based detector and detects an ATSC signal as a function of at least one threshold with respect to at least one of a carrier tracking loop lock signal, a symbol timing recovery lock signal and a synchronization (sync) lock signal, the ATSC signal detector including a state machine having at least an out of lock state, a check lock state, a lock state and a check out of lock state, wherein transitions between states are threshold-based and wherein the state machine can transition from the check lock state to the out of lock state without first transitioning through the lock or check out of lock states.

2. The apparatus of claim 1, wherein a transition between at least some of the states is a function of meeting a threshold condition for a period of time.

3. The apparatus of claim 2, wherein said at least some of the states are the check out of lock state and the out of lock state.

4. The apparatus of claim 2, wherein said at least some of the states are the check lock state and the lock state.

5. The apparatus of claim 2, wherein the period of time is related to a time period for an ATSC data segment.

6. The apparatus of claim 2, wherein the period of time is related to a time period for an ATSC PN511 segment.

7. The apparatus of claim 2, wherein the period of time is related to a time period for an ATSC PN63 segment.

8. The apparatus of claim 1, further comprising:
a processor coupled to the ATSC signal detector for forming a supported channel list comprising those ones of the number of channels upon which an ATSC signal was not detected;
wherein the processor transmits the supported channel list over the wireless network via the transceiver.

9. The apparatus of claim 1, wherein the wireless network is a Wireless Regional Area Network (WRAN).

10. The apparatus of claim 1, wherein the ATSC signal detector comprises combinatorial logic responsive to at least one of the carrier tracking loop lock signal, the symbol timing recovery lock signal and the synchronization (sync) lock signal.

11. A method for use in a wireless network receiver, the method comprising:
tuning to one of a number of channels for recovering a received signal; and
processing the received signal with an Advanced Television Systems Committee (ATSC) signal detector for use in forming a supported channel list comprising those ones of the number of channels upon which an ATSC signal was not detected, wherein the processing step includes
detecting an ATSC signal as a function of at least one threshold with respect to at least one of a carrier tracking loop lock signal, a symbol timing recovery lock signal and a synchronization (sync) lock signal, wherein the detecting step operates in accordance with a state machine having at least an out of lock state, a check lock state, a lock state and a check out of lock state, wherein transitions between states are threshold-based and wherein the state machine can transition from the check lock state to the out of lock state without first transitioning through the lock or check out of lock states.

12. The method of claim 11, wherein a transition between at least some of the states is a function of meeting a threshold condition for a period of time.

13. The method of claim 12, wherein said at least some of the states are the check out of lock state and the out of lock state.

14. The method of claim 12, wherein said at least some of the states are the check lock state and the lock state.

15. The method of claim 12, wherein the period of time is related to a time period for an ATSC data segment.

16. The method of claim 12, wherein the period of time is related to a time period for an ATSC PN511 segment.

17. The method claim 12, wherein the period of time is related to a time period for an ATSC PN63 segment.

18. The method of claim 11 further comprising:
transmitting the supported channel list.

19. The method of claim 11, wherein the wireless network receiver is a Wireless Regional Area Network (WRAN) receiver.

20. The method of claim 11, wherein the detecting step operates in accordance with a combinatorial function responsive to at least one of the carrier tracking loop lock signal, the symbol timing recovery lock signal and the synchronization (sync) lock signal.

* * * * *